June 2, 1959 W. A. SCHWINHORST 2,889,083
APPARATUS FOR DISPENSING FLOCKING MATERIAL
Filed July 11, 1956
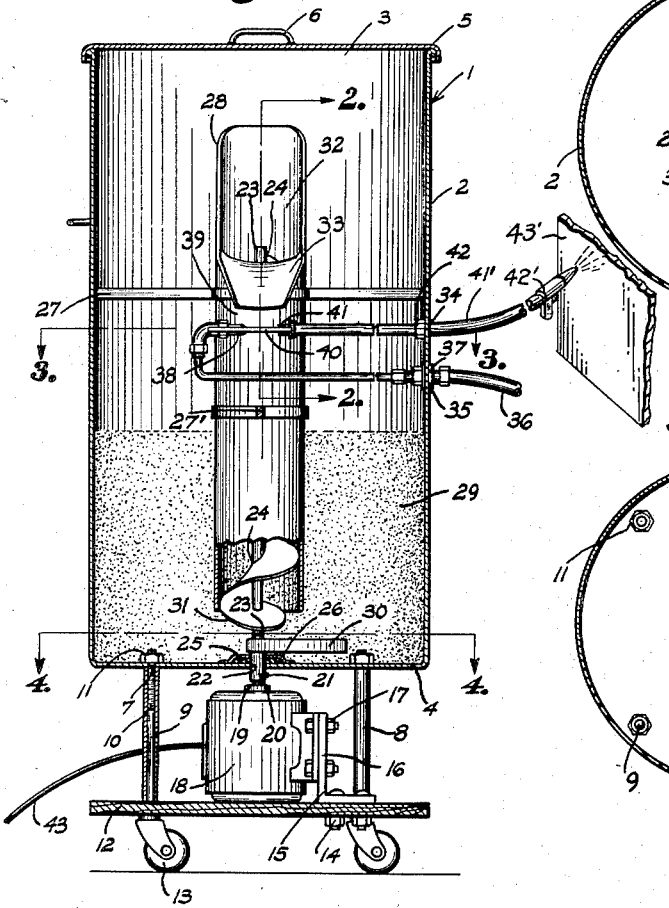
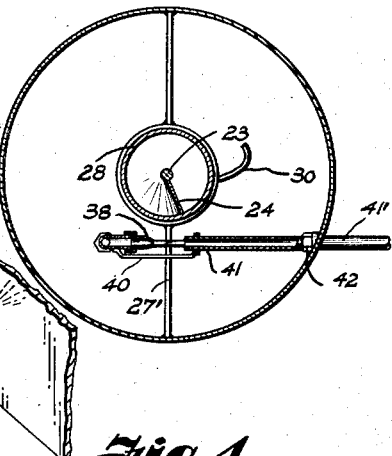
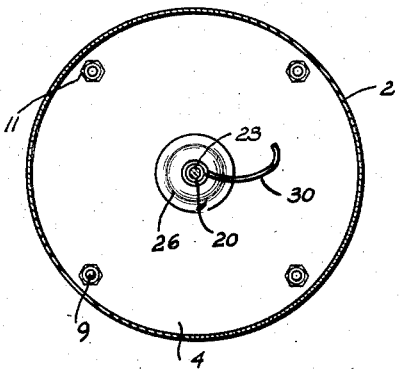
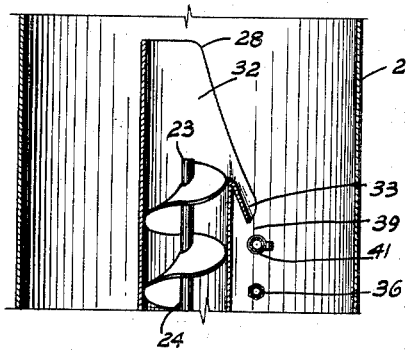
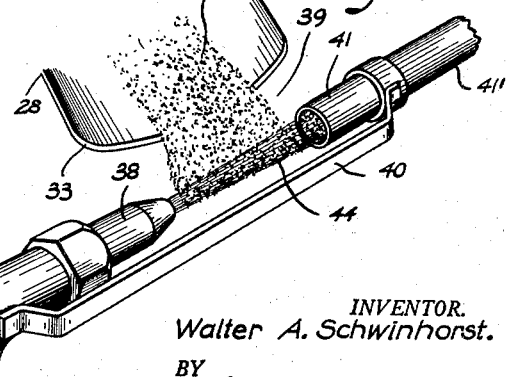
INVENTOR.
Walter A. Schwinhorst.
BY Fishburn and Gold
ATTORNEYS.

United States Patent Office 2,889,083
Patented June 2, 1959

2,889,083

APPARATUS FOR DISPENSING FLOCKING MATERIAL

Walter A. Schwinhorst, Kansas City, Mo.

Application July 11, 1956, Serial No. 597,178

3 Claims. (Cl. 222—193)

This invention relates to flocking apparatus, and more particularly to a device for applying flocking to objects by the use of air.

The invention also relates to the method of handling the flock material and applying the same to the surfaces to be coated.

Various apparatuses have been devised for applying flocking to surfaces, some of which relate to screening of the flocking to the surface to be coated, but applicant's invention is directed particularly to apparatus for the use of air for applying the flock material to surfaces desired to be coated.

It is, therefore, the principal object of the present invention to provide apparatus using air for applying flock material to surfaces; to provide a container for the flock material having an auger operated by a motor beneath the container to raise the flocking through a central tubing vertically of the container and drop the same to a chute above the air stream; to provide an air supply to the container; to provide a nozzle and the air supply underneath the chute for dropping the flocking material onto the air stream and carrying it through a confined space to a flocking gun; to provide stirring means in the flock material to allow the flock material to be engaged by the auger to raise it vertically within the vertical tubing in the container or housing; to provide for delivering the flock material to a desired location after it is raised in the container; and to provide a device of this character simple and economical to manufacture.

In accomplishing these and other objects of the invention I have provided improved details of structure the preferred forms of which are illustrated in the accompanying drawings, wherein:

Fig. 1 is a vertical cross sectional view particularly illustrating my invention.

Fig. 2 is a vertical cross section particularly illustrating the auger in the casing with the chute or dispensing unit above the air supply taken on line 2—2, Fig. 1.

Fig. 3 is a cross sectional view taken on a line 3—3, Fig. 1.

Fig. 4 is a cross sectional view taken on a line 4—4, Fig. 1.

Fig. 5 is a fragmentary perspective view particularly illustrating the chute for dispensing the flock material into the air stream to carry it to the air gun.

Referring more in detail to the drawings:

1 designates a device for dispensing flock material embodying the features of my invention comprising, a housing or container 2 having an open top 3 and a closed bottom 4. The open top may be covered by a lid 5 having a handle 6. The bottom 4 is provided with a plurality of openings 7 for a plurality of standards 8 comprising bolts or the like 9 having threaded ends 10 and secured to the bottom of the housing by nuts 11. The lower ends of the standards 8 are supported on a platform or base 12 which in turn is supported by a plurality of casters 13 so that the device may be transported or moved from place to place. Mounted upon the platform 12 by bolts or the like 14 is a bracket 15 having an upstanding arm 16 to which is mounted by bolts or the like 17 a motor 18 substantially centrally below the housing 2. The motor 18 has a drive shaft 19 extending into the lower end of a sleeve member 20 and is secured thereto by a set screw or the like 21. The sleeve member 20 extends through an opening 22 in the bottom 4 into the housing 2 and suitably secured in the upper part of the sleeve member is the lower end of a shaft 23 of an auger 24 extending vertically in the housing 2. Surrounding the opening 22 and sleeve member 20 on the inside of the bottom 4 is a sealing member 25 of foam rubber or the like. A cap-like member 26 is engaged over the seal 25 and has its lateral flanges secured to the bottom 4 thereby pressing the seal ring towards the opening 22 and sleeve member 20 and providing a tight seal.

Mounted in the housing 2 by brackets 27 and 27' is a casing 28 surrounding the auger 24. Flocking material, as indicated at 29, may be contained in the housing 2 by insertion thereof through the open top 3 by removal of the lid 5 and a stirrer or curved arm 30 is mounted on the sleeve 20 for stirring of the flock material and loosening it and carrying it inwardly so it will be picked up by the lowermost spiral of the auger as indicated at 31 (Fig. 1), to elevate the flock material through the casing 28. The casing 28 has one side open near the top as indicated at 32 and extending therefrom is a chute 33 for a purpose later described. It will be noted the auger extends to substantially even with the chute opening.

Spaced openings 34 and 35 are provided in one side of the housing 2 and an air line 36 leading from a source of supply (not shown) is attached in the opening 35 by a connection 37 and extends past the center of the housing alongside the vertical casing 28 and is turned upwardly and laterally parallel to said line. Engaging in the end thereof is a nozzle 38 which extends horizontally underneath one side of the chute 33 as indicated at 39 (Fig. 1). Spaced from the nozzle 38 and held in alignment therewith by a bracket arm 40 is a flow pipe 41 defining a passageway to which is attached a line 41' having a connection 42 in the opening 34 of the housing and the line 41' leads to a flocking gun 42' for application on a surface 43'.

In practicing my method I keep the flock material stirred and elevate it by the auger so that it will fall into the line or stream of air from the nozzle, the air picking it up and carrying it into the tubing for delivery to the air gun (not shown) as illustrated in Fig. 5. In this manner of handling the flock material any wadding or dispensing of the material will be eliminated.

In operation of a device constructed and assembled as described the flocking material 29 is placed in the housing 2 and the cover 5 applied to the housing, the motor is energized through electric line 43 which is attached to a current supply (not shown). The auger 24 will raise the flocking material by the spirals 31 so that it will be raised to the top of the casing 28 where it will fall on the chute 33 and drop therefrom to be picked up by the air stream as indicated at 44 (Fig. 5) and carried to the flocking gun 42' for application to the desired surfaces which the flocking material is intended to cover. The air is applied through line 36 and by regulating the velocity thereof through the usual valve (not shown) the air emerging from the nozzle 38 will pick up the flock material and carry it through line 41' to the flocking gun.

It will be obvious the device may be moved to any desired place of use and also it will be obvious that the stirrer or arm 30 will prevent packing of the flock material in the bottom of the housing thereby keeping it loose so that the spiral of the auger conveyor will carry it through the casing 28.

It will be obvious from the foregoing that I have provided an improved flocking apparatus for applying flock material to surfaces which is easy to manipulate and efficient in operation for the purpose desired.

It will also be obvious that my method and apparatus may be utilized for various uses and the flock material elevated or moved from one place to another for deposit in various ways.

What I claim and desire to secure by Letters Patent is:

1. Apparatus for dispensing flock material comprising, a housing containing a quantity of flock material, conveyor means extending upwardly in said housing and operative to elevate flock material upwardly therein, a downwardly inclined surface in said housing for receiving flock material from said conveyor means for flow downwardly thereon, said inclined surface having a lower edge spaced above the level of the flock material in said housing whereby flock material flowing from said inclined surface forms a free falling flat stream, an air line leading from a source of air supply into said housing and terminating in a jet opening positioned at one side of said falling stream between the lower edge of the inclined surface and the level of the flock material in the housing for directing an air jet substantially horizontally in the plane of said falling stream of flock material, and a flow conduit having an inlet opening in said housing in line with said air jet and at the other side of said falling stream of flock material, said air jet propelling fine portions of said flock material into said flow conduit for delivery to a distribution area outside of said housing.

2. Apparatus for dispensing flock material comprising, a housing having a bottom with side walls extending upwardly therefrom and containing a quantity of flock material, an upright tubular shell in said housing having an open bottom spaced upwardly from the housing bottom and arranged in the flock material in said housing, a conveyor extending upwardly in the tubular shell from said open bottom thereof, means connected to said conveyor and operative to move same to elevate flock material from said housing upwardly in the tubular shell, means on the upper portion of said tubular shell and having a downwardly inclined surface in said housing for receiving flock material elevated by said conveyor for flow downwardly on said inclined surface, said inclined surface having a lower edge spaced above the level of the flock material in said housing whereby flock material flowing from said inclined surface forms a free falling flat stream, an air line leading from a source of air supply into said housing and terminating in a jet opening positioned at one side of said falling stream between the lower edge of the inclined surface and the level of the flock material in the housing for directing an air jet substantially horizontally in the plane of said falling stream of flock material, and a flow conduit having an inlet opening in said housing in line with said air jet and at the other side of said falling stream of flock material, said air jet propelling fine portions of said flock material into said flow conduit for delivery to a distribution area outside of said housing.

3. Apparatus for dispensing flock material comprising, a housing having a bottom with side walls extending upwardly therefrom and containing a quantity of flock material in the lower portion thereof, an upright tubular shell in said housing and having an open bottom spaced upwardly from the housing bottom and positioned in the flock material contained in said housing, an auger type conveyor extending upwardly in said tubular shell from the bottom thereof, motor means connected to said auger type conveyor and operative to rotate same to elevate flock material from the lower portion of the housing upwardly in said tubular shell, means in said housing between the bottoms of said housing and said tubular shell and operatively connected to said conveyor for rotation therewith to agitate the flock material in the lower portion of said housing, a chute on the upper portion of said tubular shell and having a downwardly inclined surface in said housing for receiving flock material elevated by said auger type conveyor for flow downwardly on said inclined surface, said inclined surface of said chute having a lower edge spaced above the level of the flock material in said housing whereby flock material flowing from said inclined surface forms a free falling flat stream, an air line leading from a source of air supply into said housing and terminating in a jet opening positioned at one side of said falling stream between the lower edge of the inclined surface of said chute and the level of the flock material in the housing for directing an air jet substantially horizontally in the plane of said falling stream of flock material, and a flow conduit having an inlet opening in said housing in line with said air jet and at the other side of said falling stream of flock material, said air jet propelling fine portions of said flock material into said flow conduit for delivery to a distribution area outside of said housing.

References Cited in the file of this patent

UNITED STATES PATENTS

| | | |
|---|---|---|
| 2,029,408 | Bramsen et al. | Feb. 4, 1936 |
| 2,105,275 | Thompson | Jan. 11, 1938 |
| 2,247,794 | Wallach | July 1, 1941 |
| 2,395,157 | Work et al. | Feb. 19, 1946 |
| 2,443,663 | Rider et al. | June 22, 1948 |
| 2,496,070 | Selsky | Jan. 31, 1950 |
| 2,543,344 | Tutsch | Feb. 27, 1951 |
| 2,545,829 | Spreng | Mar. 20, 1951 |
| 2,642,033 | Miller | June 16, 1953 |
| 2,758,564 | Randall | Aug. 14, 1956 |

OTHER REFERENCES

Organic Finishing, March 1953, pp. 19–241.